United States Patent
Shim

(10) Patent No.: US 12,198,040 B2
(45) Date of Patent: Jan. 14, 2025

(54) METHOD FOR COMPRESSING NEURAL NETWORK MODEL AND ELECTRONIC APPARATUS FOR PERFORMING THE SAME

(71) Applicant: NOTA, INC., Daejeon (KR)

(72) Inventor: Kyunghwan Shim, Seoul (KR)

(73) Assignee: NOTA, INC., Daejeon (KR)

( * ) Notice: Subject to any disclaimer, the term of this patent is extended or adjusted under 35 U.S.C. 154(b) by 17 days.

(21) Appl. No.: 18/313,278

(22) Filed: May 5, 2023

(65) Prior Publication Data

US 2023/0368010 A1 Nov. 16, 2023

(30) Foreign Application Priority Data

May 11, 2022 (KR) .......................... 10-2022-0057599
Dec. 22, 2022 (KR) .......................... 10-2022-0182086

(51) Int. Cl.
*G06N 3/063* (2023.01)
*G06V 10/764* (2022.01)

(52) U.S. Cl.
CPC ........... *G06N 3/063* (2013.01); *G06V 10/764* (2022.01)

(58) Field of Classification Search
CPC ...... G06N 3/063; G06N 3/082; G06N 3/0464; G06N 3/02; G06V 10/764
See application file for complete search history.

(56) References Cited

U.S. PATENT DOCUMENTS

| 2019/0286989 A1 | 9/2019 | Wang et al. |
| 2020/0193266 A1 | 6/2020 | Scheidegger et al. |
| 2021/0073641 A1 | 3/2021 | Toshiba |
| 2021/0326710 A1 | 10/2021 | Wang et al. |
| 2021/0334663 A1 | 10/2021 | Shen et al. |

(Continued)

FOREIGN PATENT DOCUMENTS

| CN | 110062233 A | 7/2019 |
| CN | 110263628 A | 9/2019 |

(Continued)

OTHER PUBLICATIONS

Cai et al., "Pruning the Unimportant or Redundant Filters? Synergy Makes Better," 2021 International Joint Conference on Neural Networks (IJCNN), Shenzhen, China, 2021, pp. 1-8 (Year: 2021).*

(Continued)

*Primary Examiner* — Shane D Woolwine
*Assistant Examiner* — Yao David Huang
(74) *Attorney, Agent, or Firm* — BROADVIEW IP LAW, PC

(57) ABSTRACT

A method for compressing a neural network model is disclosed. The method for compressing a neural network model includes receiving, at a processor of the electronic apparatus, an original model including a plurality of layers each including a plurality of filters, a compression ratio to be applied to the original model, and a metric for determining an importance of the plurality of filters, determining the importance of the plurality of filters using the metric, normalizing the importance of the plurality of filters layer by layer, and compressing the original model by removing at least one filter among the plurality of filters based on the normalized importance and the compression ratio.

20 Claims, 12 Drawing Sheets

(56) References Cited

U.S. PATENT DOCUMENTS

| | | | |
|---|---|---|---|
| 2021/0397963 A1 | 12/2021 | Jiang et al. | |
| 2022/0237454 A1 | 7/2022 | Jain et al. | |
| 2022/0253708 A1* | 8/2022 | Tamada | G06F 18/214 |

FOREIGN PATENT DOCUMENTS

| | | |
|---|---|---|
| CN | 111723915 A | 9/2020 |
| CN | 111723915 B | 2/2021 |
| CN | 113283524 A | 8/2021 |
| CN | 113316795 A | 8/2021 |
| CN | 113408634 A | 9/2021 |
| CN | 110263628 B | 11/2021 |
| CN | 114330714 A | 4/2022 |
| CN | 114330714 B | 6/2022 |
| KR | 100926876 B1 | 11/2009 |
| KR | 101242983 B1 | 3/2013 |
| KR | 101948089 B1 | 2/2019 |
| KR | 1020190119219 A | 10/2019 |
| KR | 102102772 B1 | 5/2020 |
| KR | 1020200132627 A | 11/2020 |
| KR | 1020210031627 A | 3/2021 |
| KR | 1020210045274 A | 4/2021 |
| KR | 1020210045845 A | 4/2021 |
| KR | 1020210053020 A | 5/2021 |
| KR | 1020210072559 A | 6/2021 |
| KR | 1020210076641 A | 6/2021 |
| KR | 102283523 B1 | 7/2021 |
| KR | 1020210092575 A | 7/2021 |
| KR | 102294714 B1 | 8/2021 |
| KR | 102310187 B1 | 10/2021 |
| KR | 102315617 B1 | 10/2021 |
| KR | 1020210141252 A | 11/2021 |
| KR | 1020210142829 A | 11/2021 |
| KR | 1020220000039 A | 1/2022 |
| KR | 1020220002046 A | 1/2022 |
| KR | 102422774 B1 | 7/2022 |
| WO | 2019108923 A1 | 6/2019 |
| WO | 2021042828 A1 | 3/2021 |

OTHER PUBLICATIONS

Sun et al., "Pruning Filters With L1-norm And Standard Deviation for CNN Compression," Proc. of SPIE vol. 11041, 110412J (2019) (Year: 2019).*

Li et al., "Pruning Filters for Efficient ConvNets," arXiv:1608.08710v3 [cs.CV] Mar. 10, 2017 (Year: 2017).*

Liu et al., "Linear Substitution Pruning: Consider All Filters Together," ICCAI '22, Mar. 18-21, 2022, Tianjin, China (Year: 2022).*

Lee et al., "SNIP: Single-shot Network Pruning based on Connection Sensitivity," arXiv:1810.02340v2 [cs.CV] Feb. 23, 2019 (Year: 2019).*

Choudhary, Tejalal et al. (2021). "A transfer learning with structured filter pruning approach for improved breast cancer classification on point-of-care devices", Computers in Biology and Medicine. vol. 134, 1-13. ScienceDirect, doi:10.1016/j.compbiomed.2021.104432.

Lee, Jinsu et al. (2021). "An Overview of Energy-Efficient Hardware Accelerators for On-Device Deep-Neural-Network Training", Open Journal of the Solid-State Circuits Society. vol. 1, 115-128. IEEE, doi: 10.1109/OJSSCS.2021.3119554.

LIm, Seung-Ho et al. (2022). "Architecture Exploration and Customization Tool of Deep Neural Networks for Edge Devices", International Conference on Consumer Electronics (ICCE). 1-2. IEEE, doi: 10.1109/ICCE53296.2022.9730351.

Lu, Bingqian et al. (2019). "Automating Deep Neural Network Model Selection for Edge Inference", First International Conference on Cognitive Machine Intelligence (CogMI). 184-193. IEEE, doi: 10.1109/CogMI48466.2019.00035.

Guo, Peizhen et al. (2021). "Mistify: Automating DNN Model Porting for On-Device Inference at the Edge", 18th USENIX Symposium on Networked Systems Design and Implementation. 705-719. USENIX Association, URL:https://www.usenix.org/conference/nsdi21/presentation/guo.

Sharma, Hardik et al. (2016). "From High-Level Deep Neural Models to FPGAs", 2016 49th Annual IEEE/ACM International Symposium on Microarchitecture (MICRO). 1-2. IEEE, doi:10.1109/MICRO.2016.7783720.

Lu, Bingqian et al. (2021). "One Proxy Device is Enough for Hardware-Aware Neural Architecture Search", Proceedings of the ACM on Measurement and Analysis of Computing Systems. 1-34, 5(3) Article 34. Association for Computing Machinery (ACM), doi: 10.1145/3491046.

Hoefler, Torsten et al. (2021). "Sparsity in Deep Learning: Pruning and growth for efficient inference and training in neural networks". 1-24, 22(1) Article 241. The Journal of Machine Learning Research, doi:10.5555/3546258.3546499.

Yeager, Luke et al. (2015). "DIGITS: the Deep learning GPU Training System", ICML 2015 AutoML Workshop. 1-4. URL:https://indico.ijclab.in2p3.fr/event/2914/contributions/6476/subcontributions/170/attachments/6036/7161/digits.pdf.

Kundu, Souvik et al. (2021). "Towards Low-Latency Energy-Efficient Deep SNNs via Attention-Guided Compression". alarXiv:2107.12445v1 [cs.NE]. arXiv e-prints, doi: 10.48550/arXiv.2107.12445.

Cai, Han et al. (2018) "ProxylessNAS: Direct Neural Architecture Search on Target Task and Hardware", arXiv preprint, arXiv:1812.00332v2 [cs.LG].

Johnson, Jeff (1992) "Selectors: Going Beyond User-Interface Widgets", Association for Computing Machinery, pp. 273-279. doi: 10.1145/142750.142810.

Decision to Grant a Patent for JP 2023-541299 by Japan Patent Office dated Feb. 6, 2024.

Decision to Grant a Patent for JP 2023-541308 by Japan Patent Office dated Feb. 6, 2024.

Office Action for U.S. Appl. No. 18/163,242 by United States Patent and Trademark Office dated Jan. 17, 2024.

International Search Report for PCT/KR2023/001895 by Korean Intellectual Property Office dated Apr. 20, 2023.

Luo, Jian-Hao et al. (2017). "ThiNet: A Filter Level Pruning Method for Deep Neural Network Compression", International Conference on Computer Vision (ICCV). arXiv:1707.06342v1 [cs.CV], 5068-5076. IEEE, doi: 10.1109/CCV.2017.541.

Weng, Yui-Kai et al. (2021). "Block-Based Compression and Corresponding Hardware Circuits for Sparse Activations", Sensors. 21(22), 7468, doi: 10.3390/s21227468.

Notice of Allowance and Fee(S) Due for U.S. Appl. No. 18/163,527 by United States Patent and Trademark Office dated May 30, 2023.

Grant of Patent for JP 2023-076065 by Japan Patent Office dated Jun. 6, 2020.

Zhu, Hongyu et al. (2018). "TBD: Benchmarking and Analyzing Deep Neural Network Training", arXiv preprint, arXiv:1803.06905v2.

Office Action for KR 10-2023-0074346 by Korean Intellectual Property Office dated Aug. 22, 2023.

Office Action for U.S. Appl. No. 18/163,242 by United States Patent and Trademark Office dated Aug. 17, 2023.

Venieris, Stylianos I. et al. (2021). "OODIn: An Optimised On-Device Inference Framework for Heterogeneous Mobile Devices", IEEE International Conference on Smart Computing (SMARTCOMP). arXiv:2106.04723v1 [cs.LG].

\* cited by examiner

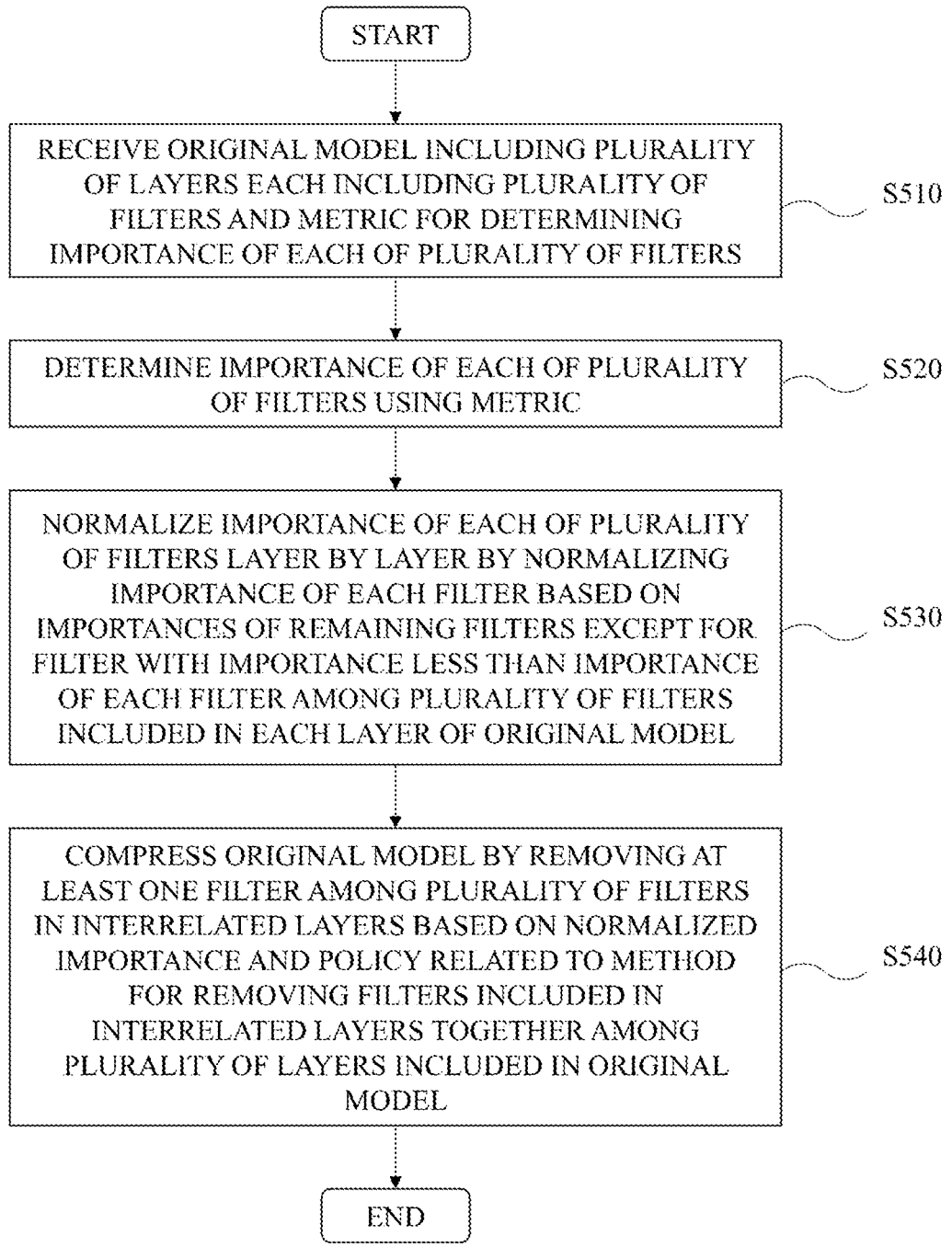

FIG. 6B
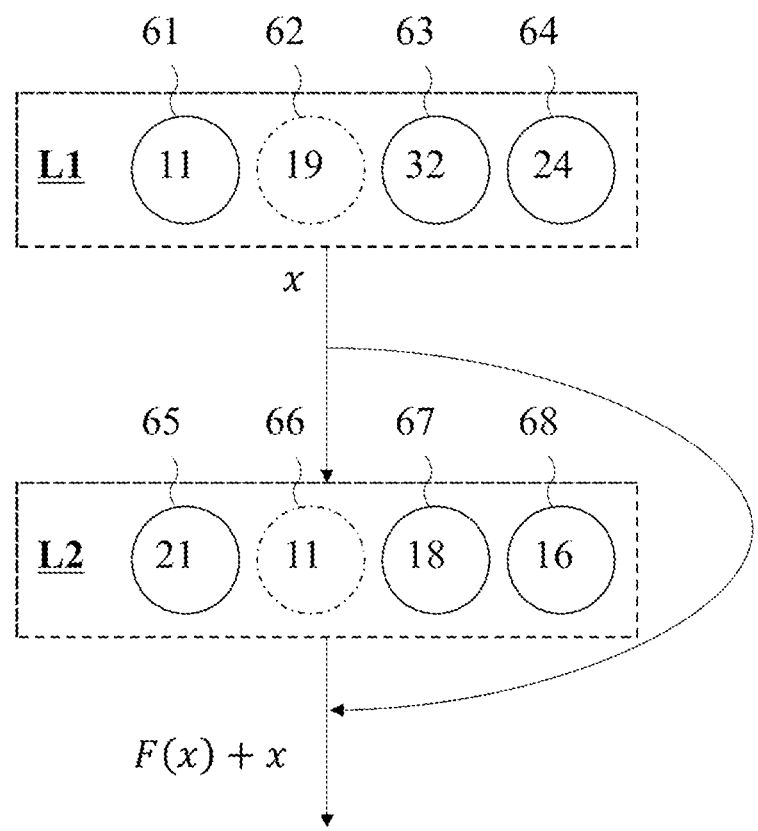
 determined filter

FIG. 7A
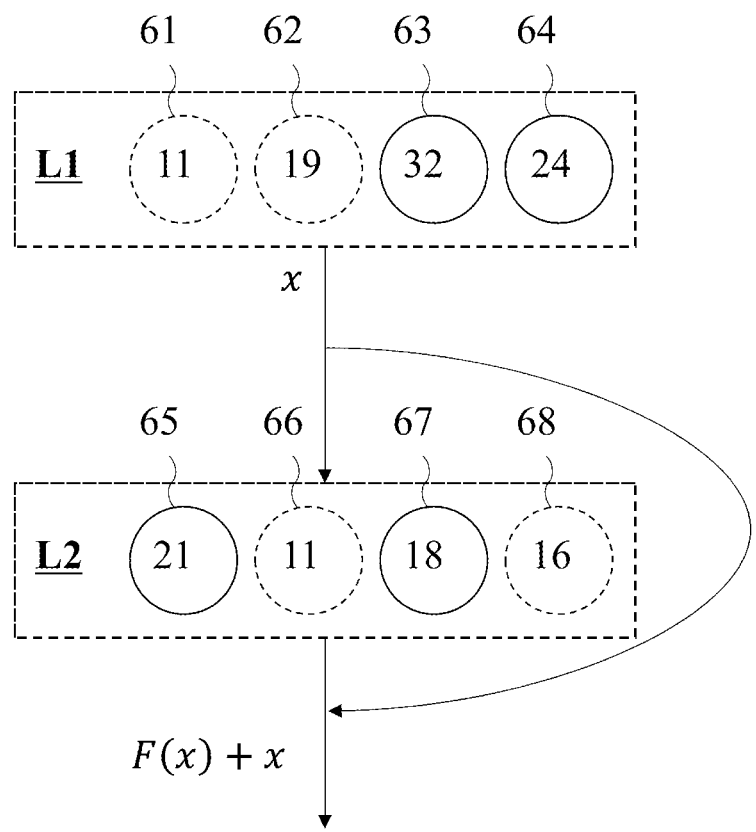

FIG. 7B
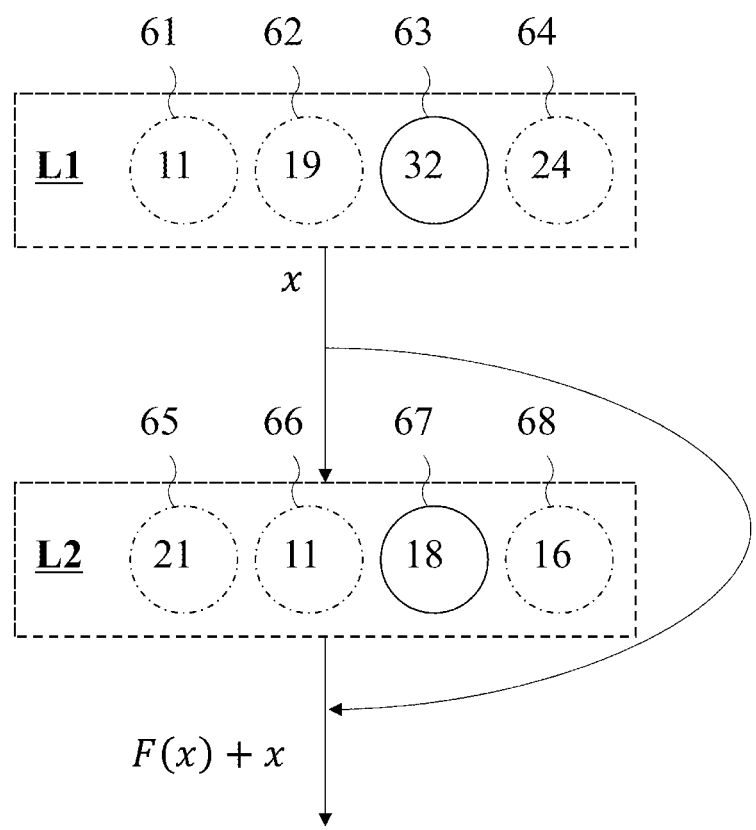
 determined filter sum of importances $F(x) + x$ determined filter

100

METHOD FOR COMPRESSING NEURAL NETWORK MODEL AND ELECTRONIC APPARATUS FOR PERFORMING THE SAME

CROSS-REFERENCE TO RELATED APPLICATIONS

This application claims priority from Korean Patent Application No. 10-2022-0057599 filed in the Korean Intellectual Property Office on May 11, 2022, and Korean Patent Application No. 10-2022-0182086 filed in the Korean Intellectual Property Office on Dec. 22, 2022, the disclosures of which are incorporated herein by reference.

BACKGROUND OF THE PRESENT DISCLOSURE

Field of the Present Disclosure

The present disclosure relates to a method for compressing a neural network model and an electronic apparatus for performing the same.

DESCRIPTION OF THE RELATED ART

Pruning is one of schemes for compressing a neural network model and is a method of removing relatively unnecessary parameters (e.g., a weight). Various types of pruning techniques have been developed so far, but there are some problems. For example, in the case of a technique of masking some weights of a filter to 0 without removing an unnecessary filter, latency is reduced only in a specific device, and thus there is no advantage in speed improvement through lightweighting.

As another example, there is also a technique for actually removing an unnecessary filter, but there is a problem in that the accuracy of a model is rapidly reduced because the entire specific layer disappears. In addition, even if the entire layer does not disappear, there is a problem in that information contained in the model is distorted by removing the filter without considering a connection relationship between the layers.

As another example, there is a method in which a user directly configures a compression ratio for each layer, but an entry barrier is very high because it requires a very high level of lightweighting knowledge from the user.

Therefore, there is a need for a pruning technique that maximizes latency reduction due to weight reduction while minimizing reduction in model accuracy and improves user convenience.

SUMMARY OF THE PRESENT DISCLOSURE

It is an object of the present disclosure to provide a compression method for maximizing latency reduction while minimizing the accuracy of a model.

It is another object of the present disclosure to provide a compression method for preventing information distortion and significant reduction in accuracy due to compression of a model.

It is another object of the present disclosure to provide a compression method with improved user convenience.

The technical objects of the present disclosure are not limited to the technical objects mentioned above, and other technical objects are not mentioned may be clearly understood by those skilled in the art from the following description.

In accordance with an aspect of the present disclosure, the above and other objects may be accomplished by the provision of a method for compressing a neural network model that is performed by an electronic apparatus, including receiving, at a processor of the electronic apparatus, an original model including a plurality of layers each including a plurality of filters, a compression ratio to be applied to the original model, and a metric for determining an importance of the plurality of filters, determining the importance of the plurality of filters using the metric, normalizing the importance of the plurality of filters layer by layer, wherein the plurality of filters includes a first filter included in a first layer, and a first importance of the first filter is normalized based on an importance of at least one remaining filter except for a filter having an importance less than the first importance among filters included in the first layer, the at least one remaining filter including the first filter, and compressing the original model by removing at least one filter among the plurality of filters based on the normalized importance and the compression ratio.

In accordance with another aspect of the present disclosure, the above and other objects can be accomplished by the provision of an electronic apparatus for compressing a neural network model, including a memory configured to store at least one instruction, and a processor, wherein execution of the at least one instruction causes the processor to receive an original model including a plurality of layers each including a plurality of filters, a compression ratio to be applied to the original model, and a metric for determining an importance of the plurality of filters, determine the importance of the plurality of filters using the metric, normalize the importance of the plurality of filters layer by layer, wherein the plurality of filters includes a first filter included in a first layer, and a first importance of the first filter is normalized based on an importance of at least one remaining filter except for a filter having an importance less than the first importance among filters included in the first layer, the at least one remaining filter including the first filter, and compress the original model by removing at least one filter among the plurality of filters based on the normalized importance and the compression ratio.

In accordance with another aspect of the present disclosure, the above and other objects can be accomplished by the provision of a method for compressing a neural network model that is performed by an electronic apparatus, including receiving, at a processor of the electronic apparatus, an original model including a plurality of layers each including a plurality of filters, and a metric for determining an importance of the plurality of filters, determining the importance of the plurality of filters using the metric, normalizing the importance of the plurality of filters layer by layer, wherein the plurality of filters includes a first filter included in a first layer, and a first importance of the first filter is normalized based on an importance of at least one remaining filter except for a filter having an importance less than the first importance among filters included in the first layer, the at least one remaining filter including the first filter, and compressing the original model by removing at least one filter among the plurality of filters in interrelated layers based on the normalized importance and a policy, the policy related to a method for removing filters included in the interrelated layers among the plurality of layers.

In accordance with another aspect of the present disclosure, the above and other objects can be accomplished by the provision of an electronic apparatus for compressing a neural network model, including a memory configured to store at least one instruction, and a processor, wherein execution of the at least one instruction causes the processor to receive an original model including a plurality of layers each including a plurality of filters, and a metric for determining an importance of the plurality of filters, determine the importance of the plurality of filters using the metric, normalize the importance of the plurality of filters layer by layer, wherein the plurality of filters includes a first filter included in a first layer, and a first importance of the first filter is normalized based on an importance of at least one remaining filter except for a filter having importance less than the first importance among filters included in the first layer, the at least one remaining filter including the first filter, and compress the original model by removing at least one filter among the plurality of filters in interrelated layers based on the normalized importance and a policy, the policy related to a method for removing filters included in the interrelated layers among the plurality of layers.

The solutions to the problems of the present disclosure are not limited to the above-described solutions, and solutions not mentioned are obvious to those skilled in the art from the specification and the accompanying drawings.

BRIEF DESCRIPTION OF THE DRAWINGS

Aspects, features, and advantages of specific embodiments of the present disclosure will become more apparent from the following description with reference to the accompanying drawings.

FIG. 5 is a flowchart a method for compressing a neural network model according to an embodiment of the present disclosure.

FIG. 6B illustrates a method of selecting a removal target.

FIG. 7A illustrates a method of determining a removal candidate.

FIG. 7B illustrates a method of selecting a removal target.

DETAILED DESCRIPTION OF THE PRESENT DISCLOSURE

Figure 1:
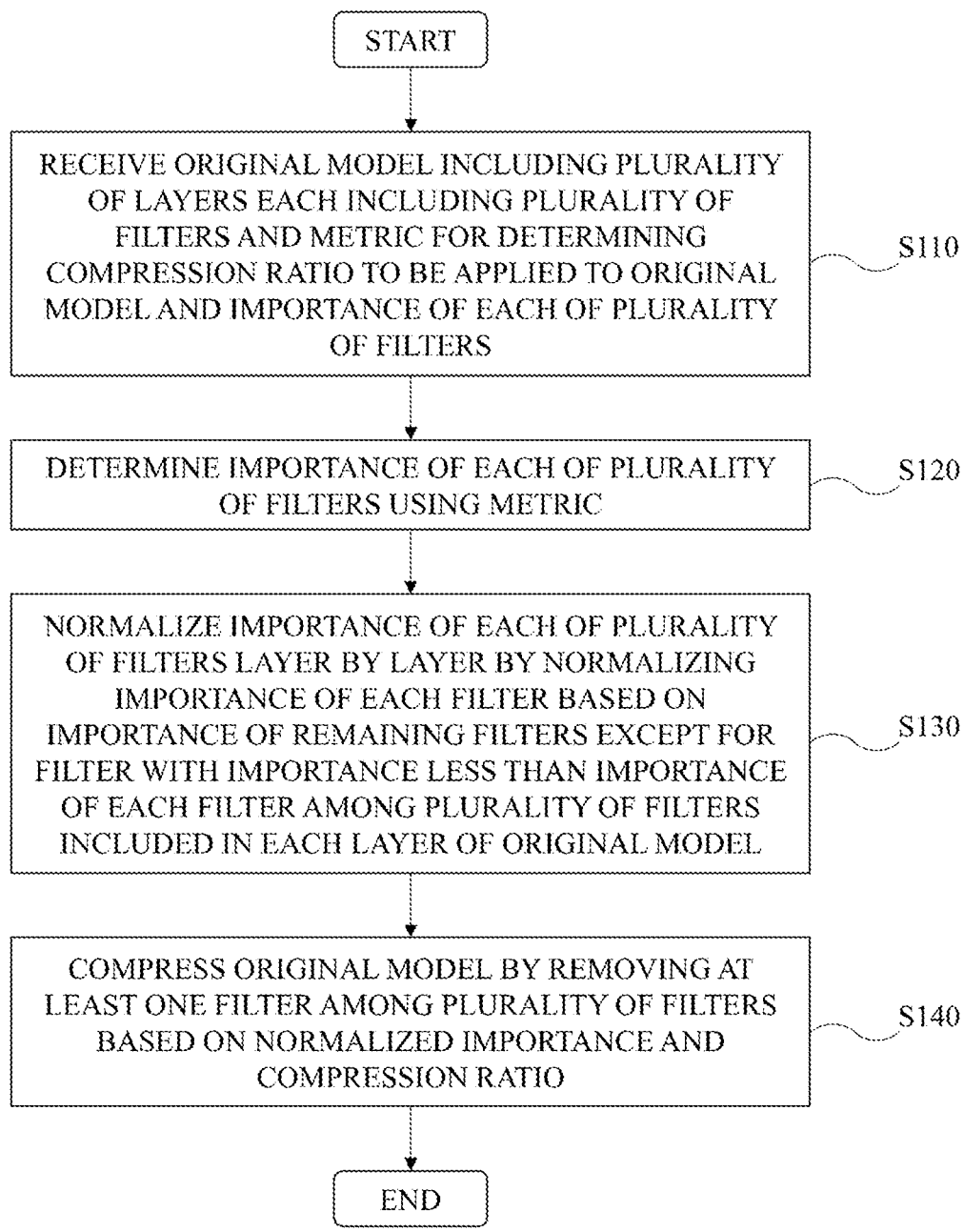
FIG. 1 is a flowchart illustrating a method for compressing a neural network model according to an embodiment of the present disclosure.

The terms used in this specification will be briefly described, and the present disclosure will be described in detail.

Most of the terms used herein are general terms that have been widely used in the technical art to which the present disclosure pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of related art are omitted when it is deemed that they may unnecessarily obscure the essence of the present disclosure.

The terms such as "first" and "second" are used herein merely to describe a variety of constituent elements, but the constituent elements are not limited by the terms. The terms are used only for the purpose of distinguishing one constituent element from another constituent element.

As used herein, the singular forms "a," "an" and "the" are intended to include the plural forms as well, unless the context clearly indicates otherwise. It will be further understood that the terms "comprises" and/or "includes" when used in this specification, specify the presence of stated features, integers, steps, operations, elements, and/or components, but do not preclude the presence or addition of one or more other features, integers, steps, operations, elements, components, and/or groups thereof.

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

FIG. 1 is a flowchart illustrating a method for compressing a neural network model according to an embodiment of the present disclosure.

Referring to FIG. 1, an electronic apparatus 100 may receive an original model including a plurality of layers each including a plurality of filters and a metric for determining a compression ratio to be applied to the original model and an importance of each of the plurality of filters (S110).

The original model may be a neural network model, and may be, for example, a model trained to classify an object in an image. The original model includes a plurality of layers, and at least some of the plurality of layers may include a plurality of filters (or kernels).

The compression ratio may be a value representing how much the original model is to be lightened, and may be, for example, a compression ratio or a pruning ratio.

The metric may be a formula for determining an importance of a filter. For example, the metric may include an L2 norm, a geometric median, a nuclear norm, and/or an L1 norm. An importance of a filter may be represented by an importance score.

The electronic apparatus 100 may receive input of an original model, a compression ratio, and a metric from a user. For example, a user device may receive a user input for selecting an original model, a compression ratio, and a metric. The electronic apparatus 100 may receive an original model, a compression ratio, and a metric, or related information from the user device.

The electronic apparatus 100 may determine an importance of each of a plurality of filters using a metric (S120). The electronic apparatus 100 may calculate an importance of each of a plurality of filters using the metric. An importance corresponding to each filter may be a scalar value.

The electronic apparatus 100 may recalculate an importance of each filter based on a redundancy of the importance of each filter. The redundancy of the importance of a specific filter may indicate how much an importance of a corresponding filter overlaps with the importance of other filters included in a layer including the corresponding filter. For example, as an importance of a first filter approaches an average value of the importance of all filters included in a first layer including the first filter, the redundancy of the importance of the first filter may increase. In addition, the greater a standard deviation of the importance of all filters included in the first layer, the greater the redundancy of the importance of the first filter.

In the process of recalculating the importance, an importance of each filter may increase or decrease according to a redundancy. For example, when a redundancy of an importance of the first filter is equal to or greater than a certain level, the importance of the first filter may decrease compared to an initial value. When the redundancy of the importance of the first filter is less than a certain level, the importance of the first filter may increase compared to the initial value.

Since the electronic apparatus 100 removes a filter with a low recalculated importance, a filter with a high redundancy may be more likely to be removed. When a filter having a high redundancy is removed, information distortion or a decrease in the accuracy of the model may be less than when a filter having an importance with a low redundancy is removed. Therefore, if the model is compressed in consideration of a redundancy, there is an advantage in that a compression level may be increased while minimizing a decrease in accuracy due to compression.

The electronic apparatus 100 may normalize an importance of each of a plurality of filters layer by layer by normalizing an importance of each filter based on an importance of the remaining filters except for a filter with an importance less than the importance of each filter among a plurality of filters included in each layer of the original model (S130). The electronic apparatus 100 may normalize the importance of each filter by dividing the importance of each filter included in a corresponding layer with the sum of importances of the filters included in the layer for each layer. For example, if the first layer contains a first filter, a second filter, and a third filter, the electronic apparatus 100 may normalize an importance of the first filter by dividing the importance of the first filter by the sum of the importance of the first filter, the importance of the second filter, and the importance of the third filter.

When normalizing is performed by dividing an importance of each filter by the sum of the importances of all filters in a layer, the importance of a filter may fade due to the number of filters as the number of the filters included in the corresponding layer increases. In addition, some layers may be removed as a compression ratio configured by a user increases. In this case, information distortion or accuracy reduction of the model may be intensified.

To prevent this, when the electronic apparatus 100 normalizes an importance of each filter, only filters that have an importance greater than or equal to an importance of a corresponding filter within a layer containing the corresponding filter may be selected. The electronic apparatus 100 may divide the importance of each filter by the sum of the importance of the selected filters. That is, when the electronic apparatus 100 normalizes the importance of each filter, filters with less importance than the importance of the corresponding filter may be disregarded.

When normalization is completed, the electronic apparatus 100 may sort all filters in order of an importance irrespective of layers. In addition, the electronic apparatus 100 may remove a filter with a low importance by a predetermined number based on a compression ratio configured by the user. As described above, when the electronic apparatus 100 normalizes an importance of each filter, a filter with an importance less than an importance of a corresponding filter is disregarded, and thus at least one filter (that is, a filter with the highest importance in each layer) remains in each layer on which compression is completed. Since at least one filter remains in each layer, the layer itself may not be removed. As such, a compression method according to the present disclosure may not remove a model layer, and thus may have an advantage in that information distortion or model accuracy reduction is reduced compared to an existing weight reduction method.

The electronic apparatus 100 may compress an original model by removing at least one filter among a plurality of filters based on the normalized importance and the compression ratio (S140). The electronic apparatus 100 may sort all filters based on the normalized importance regardless of a layer. The electronic apparatus 100 may select at least one filter of a low importance normalized based on a compression ratio. The number of filters selected may be determined according to the compression ratio. For example, as the compression ratio increases, the number of selected filters may also increase.

Figure 2:
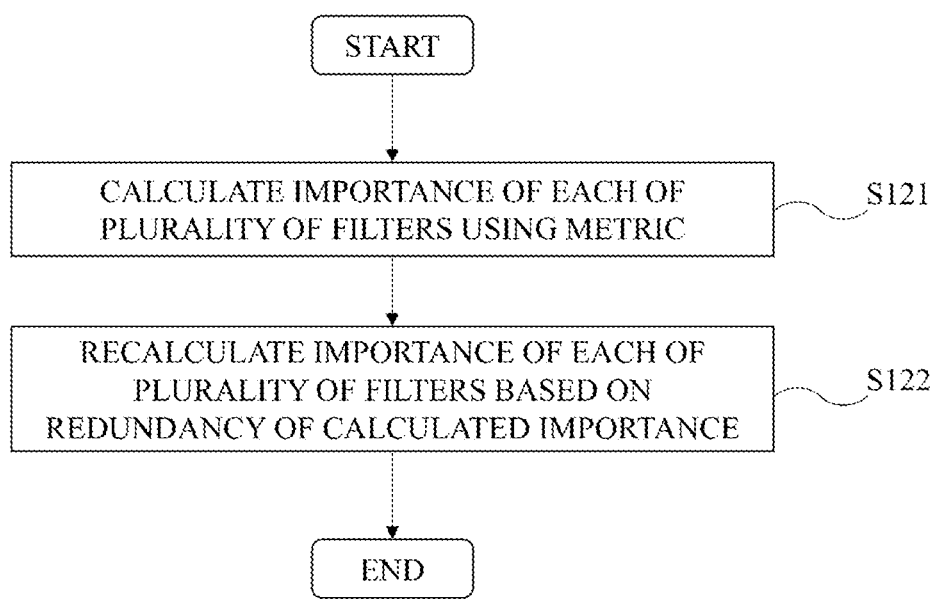
FIG. 2 is a flowchart illustrating a method (S120) of determining an importance of a filter according to an embodiment of the present disclosure.

FIG. 2 is a flowchart illustrating a method (S120) of determining an importance of a filter according to an embodiment of the present disclosure.

Referring to FIG. 2, the electronic apparatus 100 may calculate an importance of each of a plurality of filters using a metric (S121).

The electronic apparatus 100 may recalculate an importance of each of the plurality of filters based on a redundancy of the calculated importance (S122). For example, the electronic apparatus 100 may recalculate an importance of each filter by standardizing the importance of each filter. That is, the recalculated importance of the filter may be a standard score of the first calculated importance. By standardizing an importance of a filter, a redundancy of the importance may be applied to the recalculated importance.

The electronic apparatus 100 may adjust an importance of each filter according to an redundancy of the importance of each filter. For example, the electronic apparatus 100 may increase the size of an importance with a low redundancy and decrease the size of an importance with a high redundancy. When a filter having an importance with a low redundancy is removed, the filter may have a large effect on reduction in the accuracy of a model, and in contrast, even if a filter having an importance with a high redundancy is removed, the filter may have a relatively small effect on reduction in the accuracy of the model. Therefore, it may be advantageous to preserve the accuracy of the model by removing a filter having an importance with a relatively high redundancy.

Figure 3:
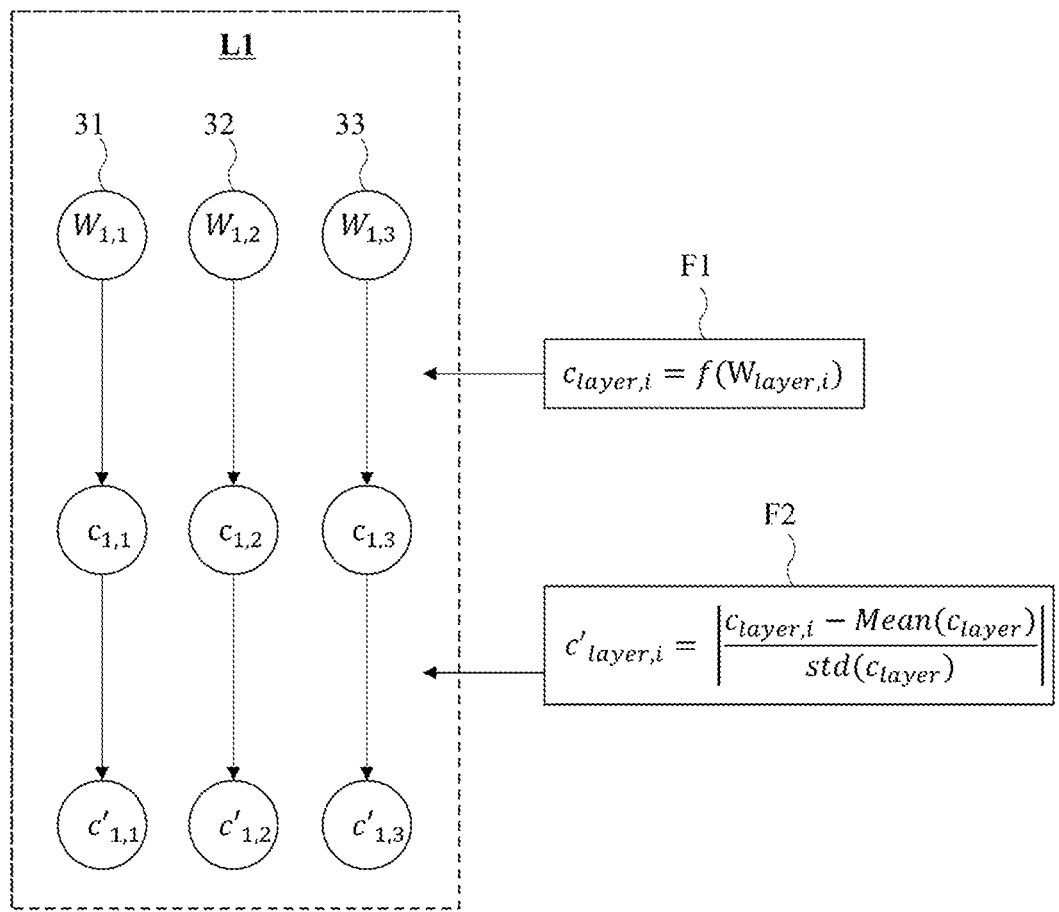
FIG. 3 is a diagram for explaining a method of determining an importance of a filter according to an embodiment of the present disclosure.

FIG. 3 is a diagram for explaining a method of determining an importance of a filter according to an embodiment of the present disclosure.

Referring to FIG. 3, a first layer L1 may include a first filter 31, a second filter 32, and a third filter 33. An illustrated circle represents a filter, and letters W, c, and r indicated in the circle represent a weight, an importance, and a recalculated importance of the filter, respectively. A subscript notation of each letter indicates (an index value of a layer, and an index value of a filter or a channel). Weights $W_{1,1}$, $W_{1,2}$, and $W_{1,3}$ of the filters 31, 32, and 33 may be a matrix having a predetermined size in which each element is a weight. For example, the weight $W_{1,1}$ of the first filter 31 may be a 3×3 matrix. In FIG. 3, a method of determining an importance of a filter based on one layer is described for convenience, but it is noted that a method described later may be applied to other layers included in the original model as it is.

The electronic apparatus 100 may calculate importances $c_{1,1}$, $c_{1,2}$, and $c_{1,3}$ of the filters 31, 32, and 33 by applying the weights $W_{1,1}$, $W_{1,2}$, and $W_{1,3}$ of the filters 31, 32, and 33 to a first formula F1. The importances $c_{1,1}$, $c_{1,2}$, and $c_{1,3}$ may be a scalar value.

The electronic apparatus 100 may recalculate the importances of the filters 31, 32, and 33 by applying the importances $c_{1,1}$, $c_{1,2}$, and $c_{1,3}$ to a second formula F2. Accordingly, the electronic apparatus 100 may standardize an importance of a filter layer by layer using the second formula F2. In the second formula F2, $\text{std}(c_{layer})$ represents a standard deviation of importances of all filters included in each layer, and $\text{Mean}(c_{layer})$ represents an average of the importances of all filters included in each layer. For the first layer L1, $\text{Std}(C_{layer})$ is a standard deviation of the importances $c_{1,1}$, $c_{1,2}$, and $c_{1,3}$, and $\text{Mean}(c_{layer})$ is an average of the importances $c_{1,1}$, $c_{1,2}$, and $c_{1,3}$.

The second formula F2 may apply a redundancy of an importance of a filter. For example, the smaller a difference between an importance of the first filter included in the first layer and an average of the importances of all filters included in the first layer, the greater a redundancy of the first filter.

Figure 4:
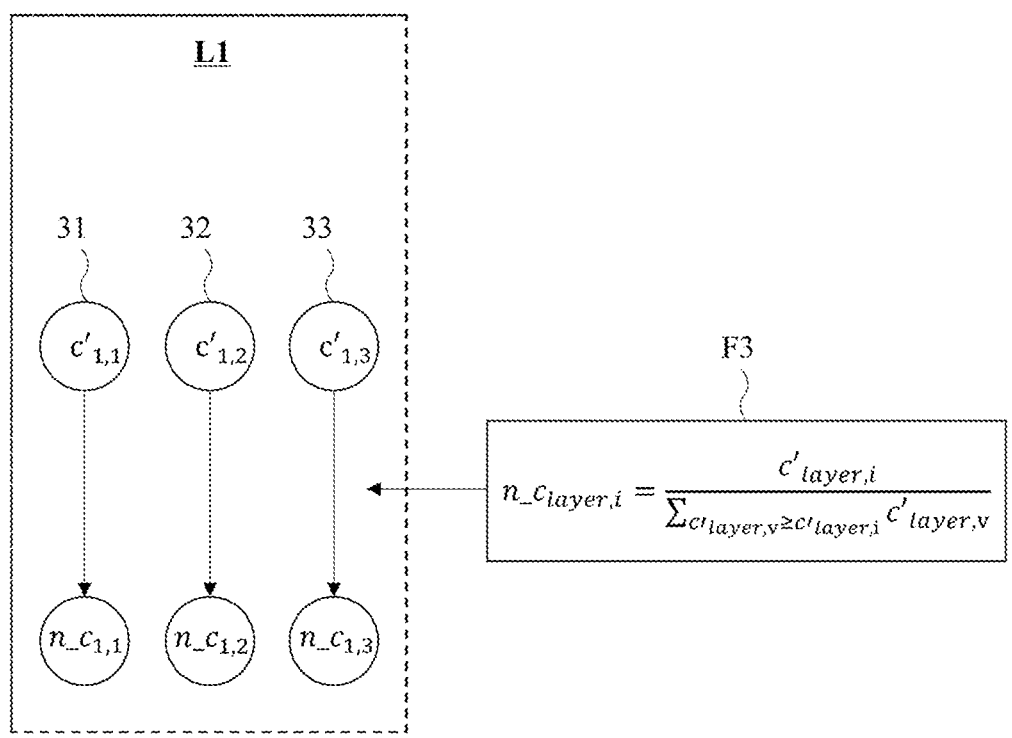
FIG. 4 is a diagram for explaining a method of normalizing an importance according to an embodiment of the present disclosure.

FIG. 4 is a diagram for explaining a method of normalizing an importance according to an embodiment of the present disclosure.

Referring to FIG. 4, the electronic apparatus 100 may normalize the filters 31, 32, and 33 by applying the recalculated importances $c'_{1,1}$, $c'_{1,2}$, and $c'_{1,3}$ of the filters 31, 32, and 33 to a third formula F3. Thus, the electronic apparatus 100 may acquire the normalized importances $n\_c_{1,1}$, $n\_c_{1,2}$, and $n\_c_{1,3}$ of the filters 31, 32, and 33.

Referring to the third formula F3, normalization may be performed layer by layer. For example, when the importance $c'_{1,1}$ of the first filter 31 is normalized, the importances $c'_{1,1}$, $c'_{1,2}$, and $c'_{1,3}$ of the filters 31, 32, and 33 included in the first layer L1 may be used, but an importance of a filter included in another layer may not be used.

As seen from a denominator of the third formula F3, when an importance of a specific filter is normalized, an importance of a filter with an importance less than the corresponding filter may not be considered. For example, if a filter with the greatest importance among the filters 31, 32, and 33 is the first filter 31, when the first filter 31 is normalized, importances of the remaining filters 32 and 33 may not be applied to the denominator of the third formula F3. Therefore, even if the number of filters included in the first layer L1 increases, importances of the filters may not fade due to the number of the filters. In addition, since an importance of a filter with the greatest importance in the first layer L1 is 1 according to normalization, the corresponding filter may not be selected in a process of selecting a filter to be removed afterwards, and thus the entire first layer L1 may not be removed.

In the third formula F3, an importance of a filter having an importance less than a corresponding filter may not be applied to the denominator. In another embodiment, in the denominator of the third formula F3, an importance of a filter having an importance less than a corresponding filter may be replaced with a very small value close to 0.

The electronic apparatus 100 may normalize importances of all filters included in the original model. The electronic apparatus 100 may sort all filters based on the normalized importances regardless of a layer. The electronic apparatus 100 may select a filter of a low importance as many as the determined number based on a compression ratio configured by a user. The electronic apparatus 100 may compress the original model by removing the selected filter. The electronic apparatus 100 may provide a lightweight model to the user. For example, the electronic apparatus 100 may provide download data corresponding to the compressed model to the user.

In FIGS. 3 and 4, the number of filters included in the first layer L1 is 3 as an example, but it is noted that the number of the filters is not limited to 3.

FIG. 5 is a flowchart a method for compressing a neural network model according to an embodiment of the present disclosure.

Referring to FIG. 5, the electronic apparatus 100 may receive an original model including a plurality of layers each including a plurality of filters and a metric for determining an importance of each of the plurality of filters (S510). For example, the original model may include a first layer and a second layer. The first layer may include a plurality of first filters. The second layer may include a plurality of second filters.

The electronic apparatus 100 may determine an importance of each of a plurality of filters using a metric (S520). The method for determining the importance of the filter has already been described in FIG. 1, and thus a detailed description thereof will be omitted.

The electronic apparatus 100 may normalize an importance of each of a plurality of filters layer by layer by normalizing the importance of each filter based on importances of the remaining filters except for a filter with an importance less than the importance of each filter among the plurality of filters included in each layer of the original model (S530). As the current step may be clearly understood through S130 of FIG. 1, a detailed description thereof will be omitted.

The electronic apparatus 100 may compress the original model by removing at least one filter among a plurality of filters in interrelated layers based on the normalized importance and a policy related to a method for removing filters included in the interrelated layers together among the plurality of layers included in the original model (S540).

In the present disclosure, the policy related to the method for removing filters included in interrelated layers together may be briefly referred to as a 'filter removal policy', a 'pruning policy', or a 'policy'. The user may input the original model to a user device and configure the pruning policy. The electronic apparatus 100 may receive the original model and the pruning policy from the user device.

The pruning policy in the present disclosure may include a first policy, a second policy, a third policy, and a fourth policy. According to the first policy and the second policy, some filters in each layer may be determined as a removal candidate, and a final target for removal may be determined based on indexes of filters determined as the removal candidate. For example, the electronic apparatus 100 may determine a first removal candidate among a plurality of first filters and a second removal candidate among a plurality of second filters based on the calculated importance and a compression ratio configured by a user.

According to the first policy, among removal candidates of each layer, a filter having the same index as a removal candidate of another layer may be determined as a removal target in the corresponding layer. For example, from the first removal candidate, a filter having the same index as the second removal candidate may be determined as a removal target in the first layer. The first policy may also be referred to as 'intersection'.

According to the second policy, not only a removal candidate of each layer, but also a filter having the same index as a removal candidate of another layer among filters not determined as a removal candidate in each layer may be determined as a removal target. For example, the removal target in the first layer may include a first removal candidate and a first filter that is not determined as the first removal candidate in the first layer but has the same index as the second removal candidate in the second layer. The second policy may also be referred to as 'union'.

According to the third policy and the fourth policy, an importance corresponding to each index (or channel) may be calculated through an additional operation between importances of filters having the same index among filters included in a plurality of layers. In addition, an index with a low importance may be selected based on a compression ratio configured by a user and an importance corresponding to each index. A filter having the selected index may be determined as a target to be removed from each layer. In the third policy, an additional operation for calculating an importance corresponding to the index may be summation. The third policy may also be referred to as 'sum'. In the fourth policy, an additional operation for calculating the importance corresponding to the index may be averaging. The fourth policy may also be referred to as 'average'.

The electronic apparatus 100 may identify a first layer and a second layer that are interrelated. In the present disclosure, interrelatedness of a plurality of layers means that a plurality of layers are connected through a predetermined operator. Here, that a plurality of layers are connected through a preset operator means that an operation based on a preset operator is performed between the plurality of layers. For example, there may be a case where the first layer and the second layer are connected through an addition operator and an addition operation between the first layer and the second layer is performed. The preset operators may include an element-wise operator and a concatenation operator. The element-wise operator may include an arithmetic operator.

The electronic apparatus 100 may calculate an importance of each of the plurality of first filters included in the first layer and an importance of each of a plurality of second filters included in the second layer. For example, the electronic apparatus 100 may calculate the importance of each of the plurality of first filters and the importance of each of the plurality of second filters based on the importance determination method of FIG. 3. Alternatively, the electronic apparatus 100 may normalize the calculated importance by additionally applying the normalization method of FIG. 4.

The electronic apparatus 100 may determine filters to be removed from the first layer and the second layer based on the calculated importance and a policy. For example, in the case of the first policy or the second policy, the electronic apparatus 100 may determine a first removal candidate among a plurality of first filters and a second removal candidate among a plurality of second filters based on the calculated importance and a compression ratio configured by a user. The electronic apparatus 100 may select a first removal target from the plurality of first filters and a second removal target from the plurality of second filters based on the policy, the first removal candidate, and the second removal candidate.

In the case of the first policy, the electronic apparatus 100 may select a filter having the same index as the second removal candidate in the first removal candidate as the first removal target. Also, the electronic apparatus 100 may select a filter having the same index as the first removal candidate in the second removal candidate as a second removal target.

In the case of the second policy, the electronic apparatus 100 may determine a filter having the same index as the second removal candidate and a first removal candidate among the plurality of first filters as the first removal target. Also, the electronic apparatus 100 may determine a filter having the same index as the first removal candidate and a second removal candidate among the plurality of second filters as the second removal target.

In the case of the third policy, the electronic apparatus 100 may determine a filter to be removed from each layer based on the sum of importances of filters having the same index among a plurality of first filters and a plurality of second filters. In the case of the fourth policy, the electronic apparatus 100 may determine a filter to be removed from each layer based on an average of importances of filters having the same index among the plurality of first filters and the plurality of second filters.

The aforementioned policies are methods for commonly applying pruning to interrelated layers. If pruning is applied to the original model based on the policy in the present disclosure, information distortion or significant reduction in model accuracy due to unbalanced pruning of interrelated layers may be prevented.

Figure 6A:
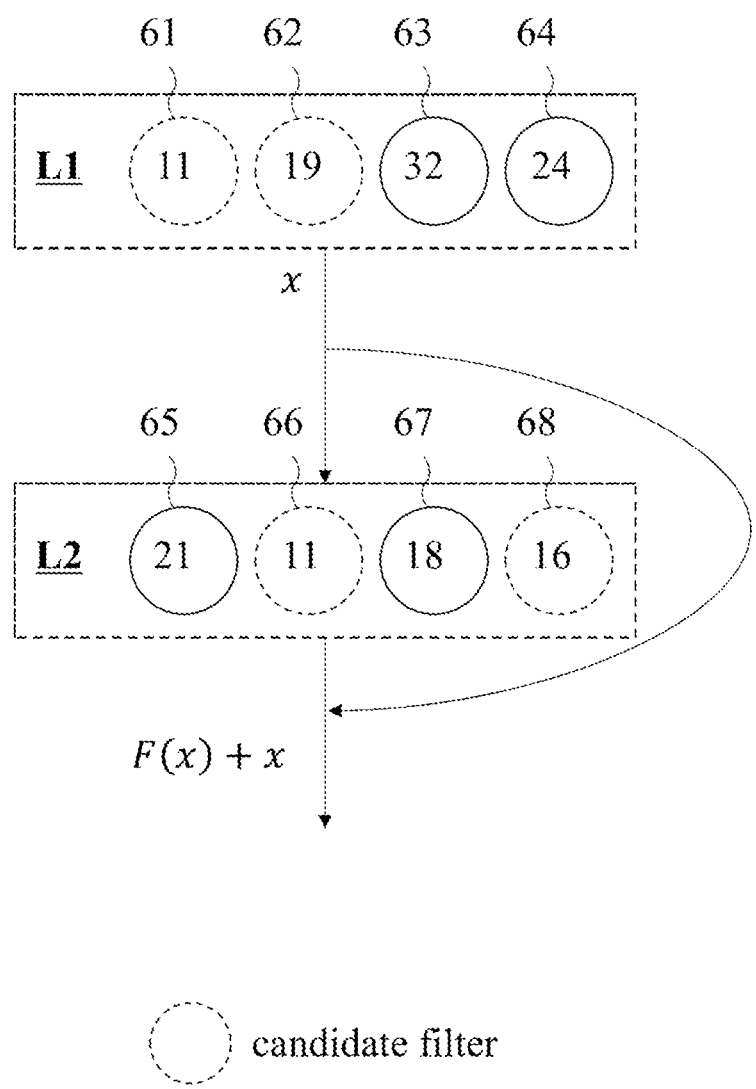
FIG. 6A illustrates a method of determining a removal candidate.

FIG. 6A and FIG. 6B are diagrams for explaining a first policy according to an embodiment of the present disclosure. FIG. 6A illustrates a method of determining a removal candidate. FIG. 6B illustrates a method of selecting a removal target.

Referring to FIG. 6A and FIG. 6B, the first layer L1 may include a first filter 61, a second filter 62, a third filter 63, and a fourth filter 64. A second layer L2 may include a fifth filter 65, a sixth filter 66, a seventh filter 67, and an eighth filter 68. The first filter 61 and the fifth filter 65 may have the same index, the second filter 62 and the sixth filter 66 may have the same index, the third filter 63 and the seventh filter 67 may have the same index, and the fourth filter 64 and the eighth filter 68 may have the same index. A number indicated within a circle representing each filter indicates an importance of the corresponding filter. The first layer L1 and the second layer L2 are interrelated layers that are connected through an addition operator.

Referring to FIG. 6A, the first filter 61 and the second filter 62 having a low importance in the first layer L1 may be determined as a first removal candidate. In the second layer L2, the sixth filter 66 and the eighth filter 68 having a low importance may be determined as a second removal candidate. In the present embodiment, the number of filters determined as a removal candidate for each layer may be 2, but this is only an example, and the number of filters determined as a removal candidate may vary according to a compression ratio configured by a user. For example, when the compression ratio configured by the user increases, the number of filters determined as a removal candidate may increase to 3.

Referring to FIG. 6B, the second filter 62 and the sixth filter 66 having the same index in the first removal candidates 61 and 62 and the second removal candidates 66 and 68 may be determined as removal targets. Specifically, in the first removal candidates 61 and 62, the second filter 62 having the same index as the second removal candidates 66 and 68 may be determined as the first removal target. In the second removal candidates 66 and 68, the sixth filter 66 having the same index as the first removal candidates 61 and 62 may be determined as the second removal target.

FIG. 7A and FIG. 7B are diagrams for explaining a second policy according to an embodiment of the present disclosure. FIG. 7A illustrates a method of determining a removal candidate, and FIG. 7B illustrates a method of selecting a removal target.

Referring to FIG. 7A and FIG. 7B, the first layer L1 may include the first filter 61, the second filter 62, the third filter 63, and the fourth filter 64. The second layer L2 may include the fifth filter 65, the sixth filter 66, the seventh filter 67, and the eighth filter 68. The first filter 61 and the fifth filter 65 may have the same index, the second filter 62 and the sixth filter 66 may have the same index, the third filter 63 and the seventh filter 67 may have the same index, and the fourth filter 64 and the eighth filter 68 may have the same index. A number indicated within a circle representing each filter indicates an importance of the corresponding filter. The first layer L1 and the second layer L2 are interrelated layers that are connected through an addition operator.

Referring to FIG. 7A, the first filter 61 and the second filter 62 having a low importance in the first layer L1 may be determined as a first removal candidate. In the second layer L2, the sixth filter 66 and the eighth filter 68 having a low importance may be determined as a second removal candidate. In the present embodiment, the number of filters determined as a removal candidate for each layer is 2, but this is only an example, and the number of filters determined as a removal candidate may vary according to a compression ratio configured by a user. For example, when the compression ratio configured by the user increases, the number of filters determined as removal candidates may increase to 3.

Referring to FIG. 7B, as a first removal target to be removed from the first layer L1, the first removal candidates 61 and 62 may be determined. And, the fourth filter 64 having the same index as the second removal candidates 66 and 68 among the filters 61, 62, 63, and 64 included in the first layer L1 may be determined. As a second removal target to be removed from the second layer L2, the second removal candidates 66 and 68 may be determined. And, the fifth filter 65 having the same index as the first removal candidates 61 and 62 among the filters 65, 66, 67, and 68 included in the second layer L2 may be determined.

Figure 8A:
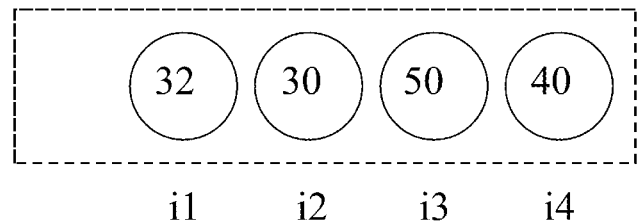
FIG. 8A illustrates the sum of importances of filters included in the first layer L1 and the second layer L2.
Figure 8B:
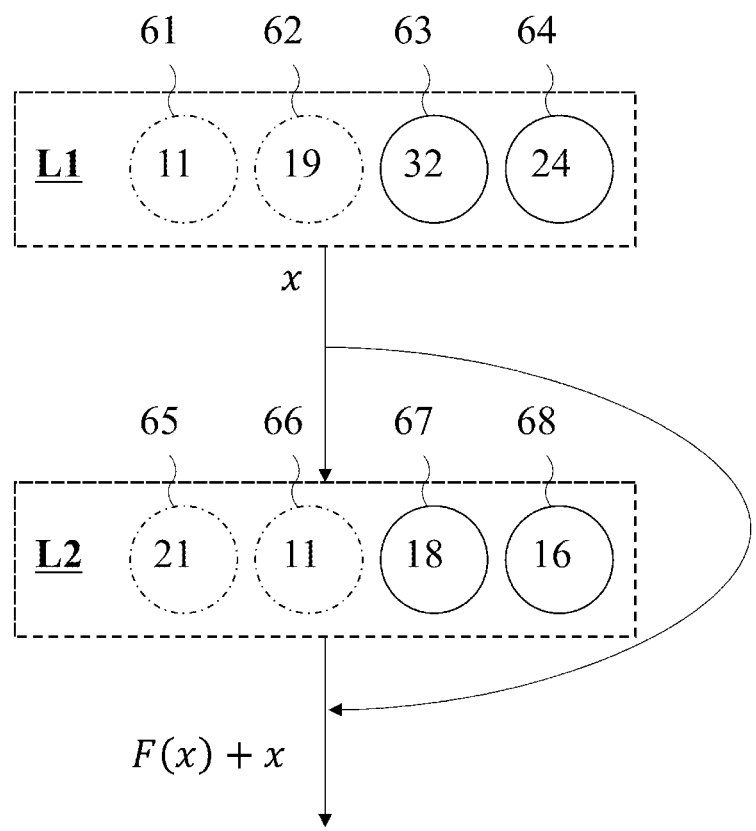
FIG. 8B illustrates a method of selecting a removal target.

FIG. 8A and FIG. 8B are diagrams for explaining a third policy according to an embodiment of the present disclosure. FIG. 8A illustrates the sum of importances of filters included in the first layer L1 and the second layer L2. FIG. 8B illustrates a method of selecting a removal target.

Referring to FIG. 8A and FIG. 8B, the first layer L1 may include the first filter 61, the second filter 62, the third filter 63, and the fourth filter 64. The second layer L2 may include the fifth filter 65, the sixth filter 66, the seventh filter 67, and the eighth filter 68. The first filter 61 and the fifth filter 65 may have a first index i1, the second filter 62 and the sixth filter 66 may have a second index i2, the third filter 63 and the seventh filter 67 may have a third index i3, and the fourth filter 64 and the eighth filter 68 may have a fourth index i4. A number indicated within a circle representing each filter indicates an importance of the corresponding filter. The first layer L1 and the second layer L2 are interrelated layers that are connected through an addition operator.

FIG. 8A illustrates the sum of importances for each index. Based on importances of the first filter 61 and the fifth filter 65 having the first index i1, an importance (i.e., 32) corresponding to the first index i1 may be calculated. Based on importances of the second filter 62 and the sixth filter 66 having the second index i2, an importance (i.e., 30) corresponding to the second index i2 may be calculated. Based on importances of the third filter 63 and the seventh filter 67 having the third index i3, an importance (i.e., 50) corresponding to the third index i3 may be calculated. Based on importances of the fourth filter 64 and the eighth filter 68 having the fourth index i4, an importance (i.e., 40) corresponding to the fourth index i4 may be calculated.

Referring to FIG. 8B, the first filter 61 and the fifth filter 65 corresponding to the first index i1 having a low importance may be determined as a removal target. In addition, the second filter 62 and the sixth filter 66 corresponding to the second index i2 may be determined as a removal target. In the present embodiment, the number of filters determined as a removal target in each layer is 2, but this is only an example, and the number of filters determined as a removal target may vary according to a compression ratio configured by a user. For example, when the compression ratio configured by the user increases, the number of filters determined as the removal target may increase to 3. Alternatively, when the compression ratio configured by the user decreases, the number of filters determined as the removal target may decrease to 1.

Figure 9A:
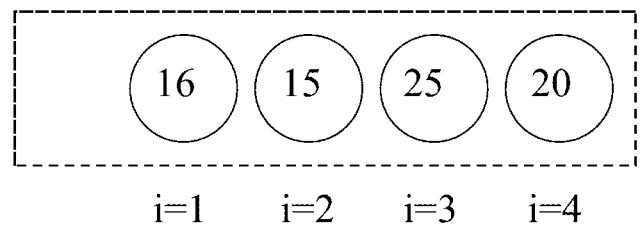
FIG. 9A illustrates an average of importances of filters included in the first layer L1 and the second layer L2.
Figure 9B:
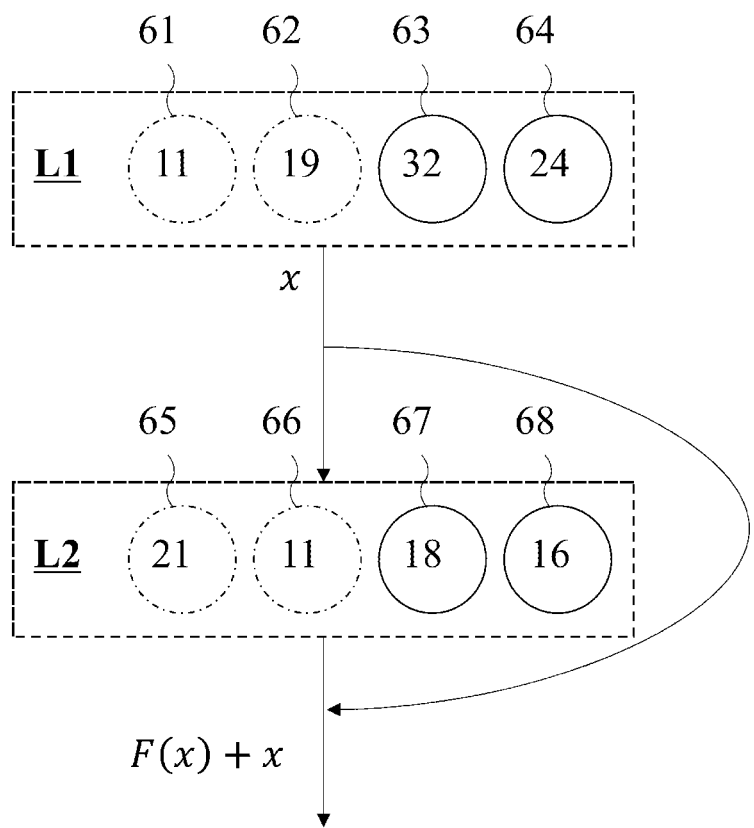
FIG. 9B illustrates a method of selecting a removal target.

FIG. 9A and FIG. 9B are diagrams for explaining a fourth policy according to an embodiment of the present disclosure. FIG. 9A illustrates an average of importances of filters included in the first layer L1 and the second layer L2. FIG. 9B illustrates a method of selecting a removal target.

Referring to FIG. 9A and FIG. 9B, the first layer L1 may include the first filter 61, the second filter 62, the third filter 63, and the fourth filter 64. The second layer L2 may include the fifth filter 65, the sixth filter 66, the seventh filter 67, and the eighth filter 68. The first filter 61 and the fifth filter 65 may have the first index i1, the second filter 62 and the sixth filter 66 may have the second index i2, the third filter 63 and the seventh filter 67 may have the third index i3, and the fourth filter 64 and the eighth filter 68 may have the fourth index i4. A number indicated within a circle representing each filter indicates an importance of the corresponding filter. The first layer L1 and the second layer L2 are interrelated layers that are connected through an addition operator.

FIG. 9A illustrates an average of importances for each index. Based on importances of the first filter 61 and the fifth filter 65 having the first index i1, an importance (i.e., 16) corresponding to the first index i1 may be calculated. Based on importances of the second filter 62 and the sixth filter 66 having the second index i2, an importance (i.e., 15) corresponding to the second index i2 may be calculated. Based on importances of the third filter 63 and the seventh filter 67 having the third index i3, an importance (i.e., 25) corresponding to the third index i3 may be calculated. Based on importances of the fourth filter 64 and the eighth filter 68 having the fourth index i4, an importance (i.e., 20) corresponding to the fourth index i4 may be calculated.

Referring to FIG. 9B, the first filter 61 and the fifth filter 65 corresponding to the first index i1 having a low importance may be determined as a removal target. In addition, the second filter 62 and the sixth filter 66 corresponding to the second index i2 may be determined as a removal target. In the present embodiment, the number of filters determined as a removal target in each layer is 2, but this is only an example, and the number of filters determined as a removal target may vary according to a compression ratio configured by a user. For example, when the compression ratio configured by the user increases, the number of filters determined as the removal target may increase to 3. Alternatively, when the compression ratio configured by the user decreases, the number of filters determined as the removal target may decrease to 1.

Figure 10:
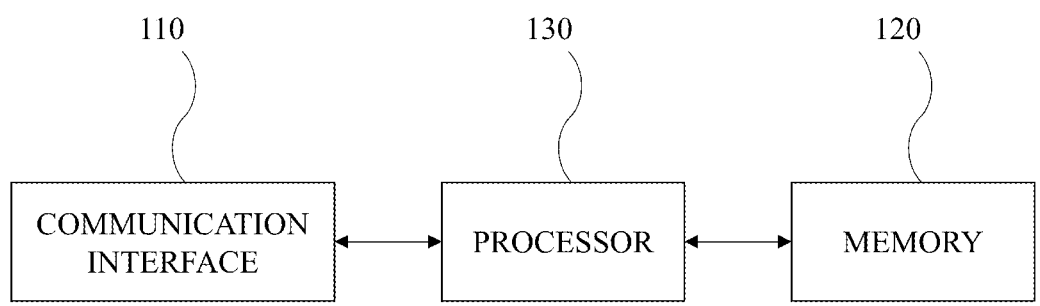
FIG. 10 is a block diagram showing the configuration of an electronic apparatus according to an embodiment of the present disclosure.

FIG. 10 is a block diagram showing the configuration of an electronic apparatus according to an embodiment of the present disclosure.

Referring to FIG. 10, the electronic apparatus 100 may include a communication interface 110, a memory 120, and a processor 130. For example, the electronic apparatus 100 may be implemented as a physical server or a cloud server.

The communication interface 110 may include at least one communication circuit and may communicate with various types of external devices. For example, the communication interface 110 may receive information about an original model, a compression ratio, and a metric from an external device. The external device may be a user device. The user device may include a personal computer and a mobile device. The user device may receive input of the original model, the compression ratio, and the metric from the user.

The communication interface 110 may include at least one of a Wi-Fi communication module, a cellular communication module, a 3G ($3^{rd}$ generation) mobile communication module, a 4G ($4^{th}$ generation) mobile communication module, a $4^{th}$ generation LTE (Long Term Evolution) communication module, a 5G ($5^{th}$ generation) mobile communication module, or the wired Ethernet.

The memory 120 may store an Operating System (OS) for controlling overall operations of components of the electronic apparatus 100 and commands or data related to the components of the electronic apparatus 100. In particular, the memory 120 may store instructions for compressing the original model. The memory 120 may be implemented as non-volatile memory (e.g., a hard disk, a solid state drive (SSD), or a flash memory) or a volatile memory.

The processor 130 may be electrically connected to the memory 120 to control overall functions and operations of the electronic apparatus 100. The processor 130 may control the electronic apparatus 100 by executing the instructions stored in the memory 120

For example, the processor 130 may obtain an original model, a compression ratio and a metric to be applied to the original model. The processor 130 may receive an original model, a compression ratio, and a metric from a user device through the communication interface 110. The original model may include a plurality of layers. A layer may include a plurality of filters (or kernels).

The processor 130 may determine an importance of each of a plurality of filters using a metric. The processor 130 may calculate an importance of each of the plurality of filters using the metric, and recalculate the importance of each of the plurality of filters based on a redundancy of the calculated importance. Depending on a redundancy of an importance, importances of filters may be adjusted. For example, the recalculated importance of the first filter may decrease as a redundancy of the calculated importance of the first filter increases. The processor 130 may calculate the redundancy of the calculated importance of the first filter based on the calculated importance of the first filter and the average and standard deviation of the calculated importances of filters included in the first layer.

The processor 130 may normalize the recalculated importance. For example, when an importance of the importance of the first filter included in the first layer is normalized, the processor 130 may normalize the importance of the first filter based on importances of the remaining filters except for a filter having an importance less than the importance of the first filter among the filters included in the first layer.

The processor 130 may sort a plurality of filters in order of an importance. The processor 130 may select at least one filter in increasing order of an importance from a plurality of filters as many as a predetermined number based on a compression ratio. Alternatively, a critical importance for selecting a filter to be removed may be determined based on a compression ratio configured by a user. At this time, the processor 130 may select a filter having an importance less than the critical importance. The processor 130 may compress an original model by removing the selected filter. Accordingly, the processor 130 may create a compressed model. Each of the plurality of layers included in the compressed model may include at least one filter.

The processor 130 may obtain an original model, and a policy related to a method for removing filters included in interrelated layers among a plurality of layers included in the original model together. In addition, the processor 130 may obtain a compression ratio for compressing the original model.

The processor 130 may analyze the original model to identify a first layer and a second layer that are interrelated. For example, when the first layer and the second layer are connected through an element-wise operator, the processor 130 may determine that the first layer and the second layer are interrelated.

The processor 130 may calculate an importance of each of a plurality of first filters included in the first layer and an importance of each of a plurality of second filters included in the second layer. The processor 130 may determine filters to be removed from the first layer and the second layer based on the calculated importance and a policy. The method of determining a filter to be removed for each policy has been described above, and a detailed description thereof will be omitted.

According to various embodiments of the present disclosure as described above, latency reduction may be maximized while minimizing reduction in model accuracy by using a compression method. In addition, information distortion or significant reduction in accuracy due to compression of the model may be prevented. In addition, a user may conveniently compress an original model, thereby improving satisfaction.

In addition, effects to be obtained or predicted due to the embodiments of the present disclosure will be directly or implicitly disclosed in the detailed description of the embodiments of the present disclosure. For example, various effects predicted according to an embodiment of the present disclosure will be disclosed within the detailed description to be described later.

Other aspects, advantages and salient features of the present disclosure will become apparent to those skilled in the art from the following detailed description, which discloses various embodiments of the present disclosure in conjunction with the accompanying drawings.

Various embodiments described above may be implemented in a recording medium readable by a computer or a similar device using software, hardware, or a combination thereof. In some cases, the embodiments described herein may be implemented in a processor itself. When implemented in software, embodiments such as procedures and functions described in this specification may be implemented as separate software modules. Each of the software modules may perform one or more functions and operations described herein.

Computer instructions for performing processing operations according to various embodiments of the present disclosure described above may be stored in a non-transitory computer-readable medium. Computer instructions stored in such a non-transitory computer readable medium may cause a specific device to perform processing operations according to various embodiments described above when executed by a processor.

A non-transitory computer readable medium is a medium that stores data semi-permanently and is readable by a device, not a medium that stores data for a short moment, such as a register, cache, or memory. Specific examples of the non-transitory computer readable media may include CD, DVD, hard disk, Blu-ray disk, USB, memory card, ROM, and the like.

The device-readable storage medium may be provided in the form of a non-transitory storage medium. Here, 'non-temporary storage medium' only means that it is a tangible device and does not contain signals (e.g., electromagnetic waves), and this term may not discriminate between the case in which data is stored semi-permanently in the storage medium and the case in which data is stored temporarily. For example, the 'non-temporary storage medium' may include a buffer in which data is temporarily stored.

Methods according to various embodiments disclosed in this document may be included and provided in a computer program product. Computer program products may be traded between sellers and buyers as commodities. A computer program product may be distributed in the form of a device-readable storage medium (e.g. compact disc read only memory (CD-ROM)), or distributed directly or online through an application store (e.g., Play Store™) or between two user devices (e.g., downloaded or uploaded). In the case of online distribution, at least a part of a computer program product (e.g., a downloadable app) is at least temporarily stored on a device-readable storage medium such as a memory of a server of a manufacturer, a server of an application store, or a relay server or created temporarily.

Although the exemplary embodiments of the present disclosure have been shown and described above, the present disclosure is not limited to the specific embodiments described above, and is commonly used in the technical field belonging to the present disclosure without departing from the gist of the present disclosure claimed in the claims. Needless to say, various modifications and implementations are possible by one of skilled in the art, and these modifications should not be individually understood from the technical spirit or prospect of the present disclosure.

What is claimed is:

1. A method for compressing a neural network model that is performed by an electronic apparatus, comprising:
   receiving, an original model including a plurality of layers, a compression ratio to be applied to the original model, and a metric for determining an importance score for a filter, wherein the plurality of layers includes a first layer including a plurality of filters;
   determining importance scores for the plurality of filters using the metric;
   normalizing the importance scores for the plurality of filters; and
   compressing the original model by removing at least one filter among the plurality of filters based on the normalized importance scores and the compression ratio,
   wherein the plurality of filters includes:
   a first filter having a first importance score,
   a plurality of second filters, each having a second importance score greater than or equal to the first importance score, and
   at least one third filter having a third importance score smaller than the first importance score, and
   wherein the first importance score is normalized based on a sum of the first importance score and the second importance scores of all second filters, excluding the third importance score from the normalization of the first importance score.

2. The method of claim 1, wherein the determining the importance scores for the plurality of filters includes:
   calculating the importance scores for the plurality of filters using the metric, and
   adjusting the importance scores for the plurality of filters based on a redundancy of the plurality of filters.

3. The method of claim 2, wherein a redundancy of the first filter is calculated based on the first importance score and an average and a standard deviation of importance scores for all filters included in the first layer.

4. The method of claim 1, wherein the original model includes a second layer connected to the first layer via a predetermined operator, and
   wherein the at least one filter to be removed from the first layer is determined by additionally using importance scores of a plurality of filters included in the second layer.

5. The method of claim 1, wherein the removed at least one filter is determined by sorting the plurality of filters in order of the importance scores for the plurality of filters, and selecting a predetermined number of filters in increasing order of an importance score from the plurality of filters, and
   wherein the predetermined number is determined based on the compression ratio.

6. The method of claim 4, wherein the at least one filter is determined based on importance scores for filters with a same index in both the first layer and the second layer, and a policy selected by a user.

7. An electronic apparatus for compressing a neural network model, comprising:
   a memory configured to store at least one instruction; and
   a processor,
   wherein execution of the at least one instruction causes the processor to:
   receive an original model including a plurality of layers, a compression ratio to be applied to the original model, and a metric for determining an importance score for a filter, wherein the plurality of layers includes a first layer including a plurality of filters,
   determine importance scores for the plurality of filters using the metric,
   normalize the importance scores for the plurality of filters layer by layer, and
   compress the original model by removing at least one filter among the plurality of filters based on the normalized importance scores and the compression ratio,
   wherein the plurality of filters includes:
   a first filter having a first importance score,
   a plurality of second filters, each having a second importance score greater than or equal to the first importance score, and at least one third filter having a third importance score smaller than the first importance score, and wherein the first importance score is normalized based on a sum of the first importance score and the second importance scores of all second filters, excluding the third importance score from the normalization of the first importance score.

8. The electronic apparatus of claim 7, wherein the processor is further configured to:
calculate the importance scores for the plurality of filters using the metric, and
adjust the importance scores for the plurality of filters based on a redundancy of the plurality of filters.

9. The electronic apparatus of claim 8, wherein the processor is further configured to calculate a redundancy of the first filter based on the first importance score and an average and a standard deviation of importance scores for all filters included in the first layer.

10. The electronic apparatus of claim 7, wherein the original model includes a second layer connected to the first layer via a predetermined operator, and
wherein the at least one filter to be removed from the first layer is determined by additionally using importance scores of a plurality of filters included in the second layer.

11. The electronic apparatus of claim 7, wherein the processor is further configured to:
sort the plurality of filters in order of the importance scores for the plurality of filters, and
select a predetermined number of filters in increasing order of an importance score from the plurality of filters,
wherein the predetermined number is determined based on the compression ratio.

12. The electronic apparatus of claim 10, wherein the at least one filter is determined based on importance scores for filters with a same index in both the first layer and the second layer, and a policy selected by a user.

13. A method for compressing a neural network model that is performed by an electronic apparatus, comprising:
receiving, at a processor of the electronic apparatus, an original model including a plurality of layers, and a metric for determining an importance score for a filter, wherein the plurality of layers includes a first layer including a plurality of filters;
determining importance scores for the plurality of filters using the metric;
normalizing the importance scores for the plurality of filters layer by layer; and
compressing the original model by removing at least one filter among the plurality of filters in interrelated layers based on the normalized importance scores and a policy, the policy related to a method for removing filters included in the interrelated layers among the plurality of layers,
wherein the plurality of filters includes:
a first filter having a first importance score,
a plurality of second filters having a second importance score greater than or equal to the first importance score, and at least one third filter having a third importance score smaller than the first importance score, and
wherein the first importance score is normalized based on a sum of the first importance score and the second importance scores of all second filters, excluding the third importance score from the normalization of the first importance score.

14. The method of claim 13, wherein the interrelated layers include the first layer and a second layer including a plurality of filters, and
wherein the removed at least one filter is determined by:
determining a plurality of first candidate filters in the first layer and a plurality of second candidate filters in the second layer based on the normalized importance scores and a compression ratio configured by a user; and
selecting at least one first target filter in the first layer and at least one second target filter in the second layer based on the policy, the plurality of first candidate filters, and the plurality of second candidate filters.

15. The method of claim 14, wherein when the policy is a first policy, among the plurality of first candidate filters, a first candidate with an index identical to one of indices of the plurality of second candidate filters is selected as the at least one first target filter, and among the plurality of second candidate filters, a second candidate with an index identical to one of indices of the plurality of first candidate filters is selected as the at least one second target filter.

16. The method of claim 14, wherein when the policy is a second policy, the at least one first target filter includes a filter with an index identical to one of indices of the plurality of second candidate filters among the plurality of first filters and the plurality of first candidate filters, and the at least one second target filter includes a filter with an index identical to one of indices of the plurality of first candidate filters among the plurality of second filters and the plurality of second candidate filters.

17. The method of claim 14, wherein when the policy is a third policy, the removed at least one filter is determined based on a sum of importance scores for filters with an identical index in both the first layer and the second layer.

18. The method of claim 14, wherein when the policy is a fourth policy, the removed at least one filter is determined based on an average of importance scores for filters with an identical index in both the first layer and the second layer.

19. The method of claim 13, wherein the interrelated layers are connected through a predetermined operator, and the predetermined operator includes an element-wise operator.

20. The method of claim 13, wherein the determining the importance scores for the plurality of filters includes:
calculating the importance scores for the plurality of filters using the metric, and
adjusting the importance scores for the plurality of filters based on a redundancy of the calculated importance scores for the plurality of filters,
wherein a redundancy of the first filter is calculated based on the first importance score and an average and a standard deviation of importance scores for all filters included in the first layer.

* * * * *